Oct. 7, 1930.   S. KANEKO   1,777,974
RAT TRAP
Filed May 25, 1928
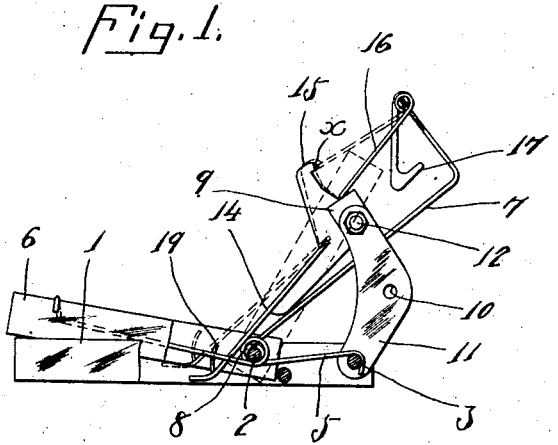
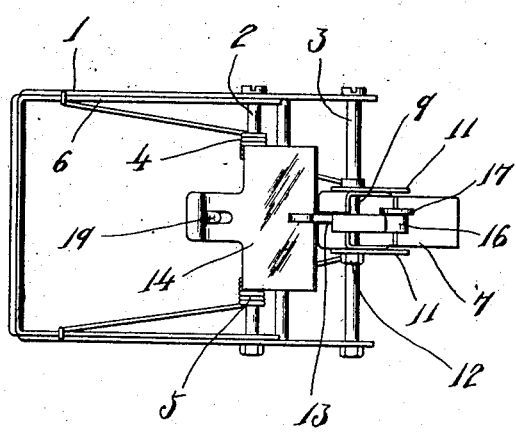
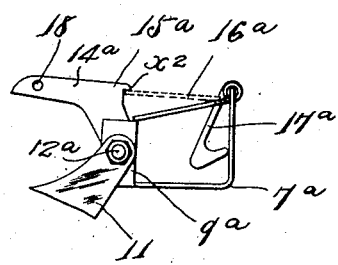
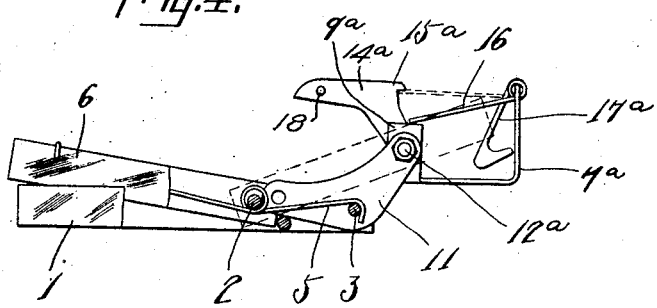
INVENTOR
Shinuemon Kaneko
BY
ATTORNEY Patented Oct. 7, 1930

1,777,974

UNITED STATES PATENT OFFICE

SHINUEMON KANEKO, OF MUTSUJIMURA, KITAADACHIGUN, JAPAN

RAT TRAP

Application filed May 25, 1928. Serial No. 280,610.

The invention relates to rat traps and has for its object to provide a trap that can be made to assume two forms, which can be readily converted from one form into the other.

A further object of the invention is to provide a trap which will prevent the rat approaching from the rear to have ready access to the bait to spring the trap and thereby frighten the rat.

The invention consists in the constructions and arrangement of parts as hereinafter described and pointed out in the claims.

Reference is had to the accompanying drawing forming a part of the specification, and in which similar characters of references designate corresponding parts in all of the views:

Figure 1 is a side view of the improvement;
Fig. 2 is a plan view;
Fig. 3 is a detail view of a modified form of bait carrier and its support; and
Fig. 4 is a side view partly in section, showing the bait carrier and support shown in Fig. 3, applied thereto.

Referring to Figs. 1 and 2, 1 and 6 are two U-shaped frames connected together by bolt 2 and upon which frame 6 is pivoted. The frame 1 extends rearwardly beyond the frame 6 and its members are connected by bolt 3. Two springs 4 and 5 are coiled on the bolt 2 and each has one end engaging the frame 6 and its other end engaging the bolt 3. Pivotally and removably mounted on the bolt 2 between the springs 4 and 5, is a rearwardly inclined L-shaped supporting member 7. The L-shape member 7 has at about the middle of its length a U-shaped piece 9, the members of which are apertured to receive the bolt 12. Upon this bolt 12 are mounted the upper ends of links 11, whose lower ends are mounted on the bolt 3. The links 11 are angular and at the junction of their members are provided with openings 10 for a purpose which will be hereinafter described.

The downwardly inclined bait plate 14 has at its upper end an upwardly projecting member 15 which has on its rear side a shoulder and is pivoted on the bolt 12 between the member of the U-shaped piece 9 of the supporting L-shaped member 7. The bait plate 14 is provided at its front end with means 19 for attaching the bait thereto. The L-shaped member 7 has pivotally mounted on its rear end the arm 16 and the hook 17. The arm 16 is for engaging the shoulder of the member 15 to hold the trap set, and the hook 17 is for engaging the frame 6 whenever it is desired to hold the frame elevated.

To set the trap the frame 6 is swung up to the position shown in dotted lines in Fig. 1 and the arm 16 swung over the frame into engagement with the shoulder $x$ of the member 15 of the bait plate, as also shown in dotted lines in said figure. When the arm 16 is in engagement with the member 15 as described, it overlies the end of the frame 6 and the frame is held raised and this trap set.

The trap shown in Fig. 4 is the same as that shown in Figs. 1 and 2, except that it has the bait carrier and rearwardly extending supporting member shown in detail in Fig. 3, applied thereto. The bait carrier $14^a$ has a downwardly extending member $15^a$, which has at its upper end a shoulder $x^2$. This member $15^a$ is pivoted on the bolt $12^a$ between the members of the U-shaped piece $9^a$ of the rearwardly extending L-shaped member $7^a$. The L-shaped member $7^a$ terminates at the U-shaped piece $9^a$ and has pivoted thereto an arm $16^a$ and a hook $17^a$ similar to those shown in Figs. 1 and 2 and for the same purpose.

To apply the form of bait carrier and supporting member shown in Fig. 3 to the trap shown in Figs. 1 and 2, to form the trap shown in Fig. 4, the L-shaped member 7 is disengaged from the bolt 2 and the bait plate 14 and the links are removed by removing the bolt 12. The member $15^a$ of the bait carrier $14^a$ is then mounted on the bolt $12^a$ between the members of the U-shaped piece $9^a$ of the L-shaped member $7^a$. It is to be understood that the bolt 12 of Fig. 1 can be employed for pivoting the bait carrier $14^a$ of the L-shaped member $7^a$. The links 11 are then mounted on the ends of the said bolt and are connected with the bolt 3 at the junction of their members by means of the openings 10. It will be seen that in this form of the trap, both the bait carrier and L-shaped member are held in a horizontal position.

It will thus be seen that the trap can be made to assume two forms, and that the change from one form to the other can be readily and quickly made. It will also be seen that by my construction the rat is prevented from readily getting access to the bait from the rear of the trap to trip the trap, which results merely in frightening the rat.

What is claimed is:

1. In a rat trap, a base frame, a pivoted and spring pressed frame on the base frame, an L-shaped and rearwardly extending member, links connecting the rearwardly extending member with the rear end of the base frame, a bait carrier having an approximately right angular member pivoted to the L-shaped member for engaging the right angular member of the bait carrier for holding the trap set.

2. In a rat trap, a base frame, a pivoted and spring pressed frame mounted on the base frame, a rearwardly extending member mounted on the base frame, a bait carrier pivoted to the rearwardly extending member intermediate of its ends, pivoted means carried by the rearwardly extending member for engaging the bait carrier for holding the trap set and link-like members pivoted to the rearwardly extending member and having means whereby they may be adjustably secured to the rear end of the base frame.

3. In a rat trap, a base frame, a pivoted and spring-pressed frame mounted on the base frame, a rearwardly extending member pivoted to the base frame, a bait carrier pivoted to the rearwardly extending member and having a projection, pivoted means carried by the rearwardly extending member for engaging the spring pressed frame to hold it raised, a pivoted member carried by the rearwardly extending member for engaging the projection of the bait carrier, link-like members having their upper ends pivoted to the rearwardly extending members, and means for adjustably securing the link-like member to the base frame to vary the connection between said member and frame.

4. A rat trap, comprising a base U-shaped frame having the members connected by a bolt, a pivoted and spring pressed U-shaped frame having its members pivoted to the base frame a distance from the rear end of the said frame, an L-shaped member rearwardly mounted on the pivot of the spring pressed frame and extending rearwardly, a bait carrier pivoted to the L-shaped member and having a projecting member at its pivoted end, a hook pivoted to the L-shaped member for engaging the spring pressed frame to hold it raised, an arm pivoted to the L-shaped member and adapted to engage the projecting member of the bait carrier, and link like members pivoted to the base frame by the connecting bolt of the said frame and to the L-shaped member by the pivot of the bait carrier.

5. A rat trap, comprising a U-shaped base plate having its members connected by a bolt, a U-shaped frame pivoted in the base frame a short distance from its rear ends, springs coiled on the pivot of said frame and having their front ends engaging the pivoted frame and their rear ends engaging the connecting bolt of the base frame, a pivoted L-shaped member removably mounted on the pivot of the pivoted frame member between said springs, said L-shaped member having at its middle a U-shaped element, a bait carrier pivoted between the members of said element and having an upwardly projecting member, an arm pivoted on the L-shaped member for engaging the member of the bait carrier, and links mounted on the base frame and on the pivot of the bait carrier.

In testimony whereof I hereunto affix my signature.

SHINUEMON KANEKO.